United States Patent [19]

Laskin et al.

[11] 4,103,050

[45] Jul. 25, 1978

[54] AQUEOUS COIL COATING PRIMER

[75] Inventors: Charles L. Laskin, Cleveland; Timothy I. Memmer, Strongsville, both of Ohio

[73] Assignee: SCM Corporation, New York, N.Y.

[21] Appl. No.: 714,063

[22] Filed: Aug. 13, 1976

[51] Int. Cl.² .................. B05D 1/38; B05D 3/02; B32B 15/08; C08L 75/06
[52] U.S. Cl. ..................... 427/379; 260/29.6 NR; 427/380; 427/388 A; 427/388 C; 428/424; 428/425
[58] Field of Search ............... 427/379, 388 A, 388 C, 427/380; 260/29.6 NR; 428/98, 424, 425

[56] References Cited

U.S. PATENT DOCUMENTS

| 3,549,404 | 12/1970 | Liberti et al. ............ 260/29.6 NR X |
| 3,637,553 | 1/1972 | Keberle et al. .......... 260/29.6 NR X |

*Primary Examiner*—James R. Hoffman
*Attorney, Agent, or Firm*—Jerry K. Mueller, Jr.

[57] ABSTRACT

A heat-curable aqueous coil coating primer for priming metal coil comprises a film-forming binder phase comprising a heat-curable, water-dispersible polyurethane polymer, and a thermosetting or thermoplastic resinous latex in synergistic combination; and a pigment phase which includes corrosion-inhibiting pigment and, optionally, opacifying pigment.

14 Claims, No Drawings

AQUEOUS COIL COATING PRIMER

BACKGROUND OF THE INVENTION

This invention relates to coil coatings and more particularly to aqueous coil coating primers for coating coil metal stock.

Coil coating primers ordinarily are applied to continuous coils of bare metal stock to protect the uncoated metal prior to fabricating of the primed metal. The bare coil metal first is cleaned of protective oil and thereafter coated with a coil coating primer. The primed, coiled metal stock ordinarily then is topcoated and subjected to a wide variety of fabricating operations and post-forming operations wherein the coiled metal is cut to length, die-formed, roll-formed, or stamped to produce a formed metal object. Due to the wide variety of subsequent fabricating, forming and bending operations, coil coating primers must possess unusual properties in order to withstand the subsequent cutting, bending, stamping, drawing, and the like whereby the integrity and adhesion to the coiled stock is maintained. Accordingly, coil coating primers must have flexibility and adhesion to withstand subsequent bending operations as well as chemical and corrosion resistance, humidity, and water resistance to protect the primed metal before subsequent fabrication processes. The coil coating primer further must provide protection for and adhesion to the finished topcoat and maintain integrity and adhesion to the coiled stock.

Although solvent-based coil coating primers predominantly have been used in the past, economics and environmental considerations dictate that aqueous coil coating primers are most desirable for industrial use, but generally have been unsatisfactory to preclude corrosion and adequately prime the bare metal coil in addition to providing the necessary flexibility, impact resistance, adhesion to the metal coil, chemical and corrosion resistance, humidity and water resistance, and exterior durability as well as providing adhesion of the primer to the finished topcoat.

It now has been found that an aqueous coil coating primer based on a water-dispersible polyurethane polymer capable of being thermally cured in synergistic combination with a latex effectively provides an improved coil coating primer.

SUMMARY OF THE INVENTION

A heat-curable aqueous coil coating primer for priming coiled metal stock comprises a film-forming binder phase, and a pigment phase of corrosion-inhibiting pigment. The weight ratio of the pigment to binder phase (P/B) is between about 0.05 to about 1.0. The binder phase comprises water-dispersible polyurethane polymer, and a film-forming, water-dispersible thermosetting and/or thermoplastic latex phase in synergistic combination. Preferably, the binder phase contains about 10% to 85% of the polyurethane and 15% to 90% of the latex.

DETAILED DESCRIPTION OF THE INVENTION

The binder phase comprises a heat-curable, water-dispersible polyurethane polymer and film-forming, water-dispersible polymer phase of thermosetting or thermoplastic polymers in synergistic combination.

As used in this application, "synergistic combination" comprehends two distinct criteria by which the present coil coating is evaluated: (1) the overall (or average) performance of the present coil coating primer must be better than a coil coating primer formulated from each of the components individually; and (2) the overall performance of the present coil coating primer must be unexpectedly greater than the performance that one skilled in the art would expect from the mere combination of the individual components of the primer. The overall (or average) performance of a coil coating primer is determined by present day standards of this art, which include (1) flexibility and impact resistance, (2) adhesion of the primer to the bare metal coil and to the subsequently applied topcoat, (3) chemical and corrosion resistance, (4) humidity and water resistance, and (5) exterior durability. While an individual performance characteristic may be the same or only slightly improved by the present primer compared to a primer containing only one of the components of the synergistic combination, it is the overall (or average) performance of all of the foregoing performance standards which must be viewed and evaluated for determining the performance of the primers. It also must be recognized that the foregoing standards represent the standards of the art presently and these standards may be subject to modification and refinement in the future, which future performance standards are not limitative or definitive of the present invention.

Referring now to the heat-curable, water-dispersible polyurethane polymer, the polyurethane polymer can be a polyester-polyurethane, silicone polyurethane, silicone-acrylic polyurethane, epoxy polyurethane, epoxy-ester polyurethane, acrylic urethane, polyurethane, and the like. Typically, the polyurethane polymers will contain pendant carboxyl and hydroxyl groups for dispersing or solubilizing the polymer in water and for curing of the polymer. Typical water-dispersible polyurethane polymers can be found in, for example, U.S. Pat. Nos. 3,412,054, 3,759,873, 3,962,522, 3,773,729, 3,897,377, and 3,860,546, the same incorporated herein by reference.

A preferred polyurethane polymer is a polyester-polyurethane polymer generally formulated from an isocyanate, a polyol, a polyhydroxy carboxylic acid, and a dicarboxylic acid. The polyol generally is a diol or triol and can be an ester-free diol or a polyester diol formulated from a dicarboxylic acid and a glycol. Representative diols include polylactone diols, polypropylene glycols, polyether diols, vinyl diols, epoxy diols, phenolic diols, and the like. Typical dicarboxylic acids include the acids: adipic, azelaic, succinic, tetrahydrophthalic, glutaric, and the like; and typical glycols include ethylene glycol, propylene glycol, butane diol, hexane diol, neopentyl glycol, trimethylolpropanemonoallylether, diethylene glycol, dipropylene glycol, tripropylene glycol and the like. The polyurethane polymer further contains a diisocyanate component which preferably is toluene diisocyanate for the advantageous properties which it imparts to the coil coating primer. Other useful representative diisocyanates include isophorone diisocyanate, trimethyl-hexamethylene diisocyanate, phenoline diisocyanate, diphenylurethane diisocyanate, methylene diisocyanate, and the like. The preferred polyurethane polymer further includes a third component of dimethylolpropionic acid (DMPA) which reacts with the dicarboxylic acid in forming the polyurethane polymer wherein the polymer retains its pendant carboxyl groups in unreacted form for dispersing the polyurethane polymer in water.

The polyurethane polymer can be a self-curing urethane utilizing a blocked or masked isocyanate which unblocks upon heating for curing. Alternatively, the polyurethane can be thermally cured with a cross-linking agent such as an aminoplast. Typical aminoplast cross-linking agents include melamine, melamine formaldehyde, urea formaldehyde condensates, triazine formaldehyde, benzoguanamines, and the like. The polyurethane polymer is neutralized with ammonia, an amine, amine salt or amine derivative, or the like for dispersing the polyurethane polymer in water. Suitable amines include, for example, ammonium hydroxide, ethylamine, propylamine, diisopropylamine, dimethylethanolamine, and the like.

The weight proportion of the polyurethane polymer generally is between about 10% and 85%, advantageously between about 15% and 60%, and preferably between about 25% and 35% by weight of the binder phase. The individual proportions of the polyurethane polymer and cross-linking agent (when required) are adjusted accordingly to maintain the preferred weight proportion of their combination. The proportion of the polyurethane polymer generally is between about 5% and 60%, advantageously 10% and 40%, and preferably 15% and 25%; and proportion of the cross-linking generally is between about 5% and 25%, advantageously 5% and 20%, and preferably 10% and 20%, all proportions by weight of the binder phase.

The binder phase of the coil coating primer further contains heat-curable (thermosetting or thermoplastic) water-dispersible polymer phase, such as acrylic latex polymers or copolymers. Useful water-reducible latex polymers also include modified acrylic polymers such as styrene acrylics, water-reducible polyesters, silicone acrylics, vinyl chloride, epoxy compounds, epoxy esters, vinyl acetates, and polybutylacrylate copolymers, ethylacrylate-methylmethacrylate copolymers, and the like and combinations thereof. Many other latex polymers for coil coatings are known generally and are apparent to those skilled in the art. The water-dispersible latex polymers generally are present in a proportion of between about 15% and 90% by weight of the binder phase, advantageously about 40% and 85%, and preferably about 65% and 75%.

The primer further contains corrosion-inhibiting pigment and can contain opacifying pigment if desired. Opacifying pigments have an index of refraction of at least about 1.8 and include titanium dioxide, zinc oxide, and the like. Corrosion-inhibiting pigments include barium chromate, strontium chromate, lead chromate, zinc chromate, basic zinc chromate, various molybdate and phosphate pigments, and the like. Further filler or extender pigments include talcs, clay, silica, etc. The pigment phase of the primer can contain by weight about 2% to 75% corrosion-inhibiting pigment and about 98% to 25% opacifying pigment. Generally, the weight ratio of the pigment to the binder phase (P/B) will range from about 0.05 to about 1.0, and preferably between about 0.5 to 0.53. Preferably, the pigment phase will comprise about 80% titanium dioxide pigment and about 20% strontium chromate by weight of the pigment phase for good corrosion inhibition of the primer. Various other modifiers advantageously can be included in the primer including dispersants, surfactants, de-foamers, plasticizers, catalysts, and the like.

The compatibility of the polyurethane polymer and latex in water can create stability and performance difficulties depending upon the particular types and functionalities each of these two components has. In a preferred embodiment of this invention where the binder phase contains a polyester-polyurethane and aminoplast cross-linker therefor, and acrylic latex resins, a foam developed upon forming a mixture of the components which probably is attributable to the incompatibility of the particular polymers used. A special de-foaming step was added to the process, as more particularly shown in the examples. It is believed that while the de-foaming operation as practiced in the examples is desirable, such operation is not critical to the invention.

The primer generally will have a non-volatile weight solids content of about 35% to 65% and preferably about 40% to 55%. The primer is applied to the metal coil by conventional techniques such as brushing, spraying, flow coating, dipping, direct roll coat, and preferably reverse roll coat. The dry film thickness of the primer typically is between about 0.10 and 0.50 mils. The primer then can be heat-cured at about 360°-470° F. peak metal temperature followed by application of the topcoat to the cured primer film. Alternatively, the primer can be subjected to forced air drying at a temperature of about 200° F. or less followed by application of the topcoat with both the primer and topcoat being simultaneously cured by heating at about 360°-470° F. peak metal temperature in a conventional monobake process to yield a unique monobaked configuration (cured film network) of the primer and topcoat.

The coil can be steel or aluminum, for example, galvanized, cold-rolled or electrogalvanized. The most dramatic effect of the inventive primer can be seen when the primer is coated over galvanized steel or aluminum as can be seen in the examples which follow.

Various topcoats which can be applied to the primer of this invention include oil-free polyesters, alkyds, urethanes, vinyl acetates, polyvinylized fluorides, silicone polyesters, silicone acrylics, silicone urethanes, acrylics, and the like. Generally, the topcoat is applied over the primer to a film thickness of about 0.3 to 5 mils with about 0.4 to 1.2 mils average film thickness being preferred. The primer of this invention displays excellent intercoat adhesion (adhesion between the primer and topcoat) as well as excellent adhesion to the metal coil.

The following Examples will show how the present invention can be practiced, but should not be construed as limiting the invention.

EXAMPLE 1

Preparation of Polyester-Polyurethane Polymer

A water-dispersible polyester-polyurethane was formulated from 0.95 moles of hydrogenated bishphenol A, 0.32 moles of adipic acid, 0.74 moles of dimethylol propionic acid (DMPA), and 1 mole of toluene diisocyanate. The hydrogenated bisphenol A, adipic acid, and dimethylol propionic acid were dispersed in methylethylketone solvent in a reaction vessel and the vessel's contents held under reflux at about 80°-85° C. To the refluxing mixture toluene diisocyanate was slowly added over a 12-hour period. When the isocyanate content in the reaction mixture was determined to be essentially zero by infrared analysis, the reaction was terminated. Then 2-butoxy ethanol-1 solvent was added to the vessel and the methylethylketone solvent distilled off leaving a 67% weight solids dispersion of the polyester-polyurethane in the vessel.

Preparation of the Coil Coating Primer

The coil coating primer was formulated from the following ingredients:

| | NON-VOLATILE SOLIDS (weight percent) |
|---|---|
| Latex: | 43.68 |
| *RHOPLEX MV-1 thermoplastic acrylic latex (34.94%) | |
| *RHOPLEX MV-17 thermoplastic acrylic latex (8.74%) | |
| Polyester-polyurethane | 13.78 |
| Hexamethoxymethylmelamine (HMMM) (cross-linking agent) | 8.01 |
| Pigment: | 34.53 |
| Strontium Chromate (6.11%) | |
| Titanium Dioxide (28.42%) | |

*RHOPLEX is a registered trademark of Rohm & Haas Company, Philadelphia, Pennsylvania.

The primer was compounded by first dispersing the pigment components in a portion of the acrylic latex and subjecting this pigment dispersion to the action of a sand mill to provide a pigment paste of about a Hegman 7 grind size. This pigment dispersion also contained a surfactant, ethylene glycol, tributylphosphate, and dimethylethanolamine (a total about 2% by weight of the primer). The remaining portion of the acrylic latex then was added to the ground pigment paste and this mixture allowed to stand overnight to defoam.

Separately, the polyester-polyurethane was neutralized with dimethylethanolamine and with the cross-linking agent was dispersed in water to a 45% non-volatile solids content. This dispersion also was allowed to stand to defoam. Alternatively, the polyester-polyurethane can be provided in an emulsion or in the aqueous dispersion without the cross-linking agent which may be added to the primer later.

The defoamed acrylic latex-pigment mixture and the defoamed polyester-polyurethane dispersion then were dispersed in water to provide a primer having a 51.9 non-volatile weight solids content and a pigment to binder weight ratio (P/B) of 0.53.

EXAMPLE 2

Two comparative coil coating primers were formulated, the first containing only acrylic latex binder and the second containing only polyester-polyurethane binder. The formulation ingredients for each comparative primer are listed below:

| INGREDIENT | NON-VOLATILES (weight percent) | |
|---|---|---|
| | Latex Primer | Urethane Primer |
| Latex: | 62.48 | — |
| RHOPLEX MV-1 (49.98%) | | |
| RHOPLEX MV-17 (12.50%) | | |
| Polyester-Polyurethane | — | 63.16 |
| Hexamethoxymethylmelamine | 3.23 | 13.94 |
| Pigment: | | |
| Strontium Chromate | 6.86 | 4.6 |
| Titanium Dioxide | 27.42 | 18.4 |

The primers were formulated by a process analogous to that described in Example 1. Each of the two comparative primers also contained minor amounts of a defoamer, pigment wetting agent, a glycol, and tributyl phosphate. The latex primer had a 56% non-volatile weight solids content and a pigment-to-binder ratio (P/B) of 0.52. The urethane primer had a 39% non-volatile solids content and a P/B ratio of 0.42. The urethane primer became too viscous for practical industrial coil coating operations at non-volatile solids content of above about 40%.

EXAMPLE 3

The two comparative primers and the inventive primer each were applied to clean (oil-free) aluminum panels at a film thickness of about 0.15–0.2 mils and subjected to forced air drying at 120° F. A topcoat comprising a copolymer of butyl acrylate, methacrylic acid, methylmethacrylate, and 2-hydroxyethylacrylate was applied over all the primed panels at a film thickness of 0.8–0.9 mils. To complete the monobake curing process, the panels then were heated at 420° F. (peak metal temperature) for about one minute.

The synergistic binder combination of the present inventive primer is demonstrated in the following comparative performance evaluation tests.

Flexibility and Impact Resistance

A set of panels for each primer was subjected to a 2T bend test (a 180° bend plus 2 more folds). The latex and inventive primers showed no tearing off of the coating while the urethane primer had complete cracking with all of the coating in the bend area coming off with tape. At a reverse impact of 85 inch-pounds, the latex primer showed signs of cracking with about 5% of the coating being lifted off with tape from the impacted area. The inventive primer, however, showed no signs of cracking and none of the coating at the impacted area could be pulled off with tape. The urethane primer, however, had 50% the impacted area cracked and 50% of the coating removed with tape at a reverse impact of only 20 inch-pounds.

Water Sensitivity

The panels were immersed in water at 100° F. for 16 hours, removed from the water, and towel dried. The pencil hardness of the topcoats covered each primed panel then was immediately determined. The topcoat over the latex primer had a pencil hardness of 6B while the topcoat over the primer of this invention had a pencil hardness of 2B. The topcoat covering the urethane primer had a pencil hardness of 11B.

Mastmaasis

Each panel was subjected to a mastmaasis (acetic acid-salt spray resistance) test according to a modified version of the procedure of ASTM B 287-62. This modified procedure subjects the panels to 45 minutes of the acetic acid-salt spray in a closed cabinet followed by a 2-hour air purge of the cabinet during which the relative humidity is lowered to about 50%. Next, the cabinet is sealed and the panels steeped in the humid (about 90% relative humidity) corrosive atmosphere in the cabinet for 3 hours and 15 minutes. This six-hour cycle then is repeated 60 times.

The panel having the inventive primer coated thereon showed a maximum blister size of 7 on 50% of the area of the edge of the panel and no blisters on the face of the panel nor on the scribed area. The latex primed panel showed a maximum blister size of 6 on 80% of the area of the edge, a maximum blister size of 9 on 20% of the face area, and a maximum blister size of 6 on 50% of the scribed area. The urethane primer panel blistered to such an extent on all areas that it was deemed to have failed this test.

Salt Spray Resistance

Equivalently coated panels of galvanized steel were subjected to a 500-hour salt spray resistance test according to the procedure of ASTM B 117-64.

The panel having the inventive primer had a 25% tear off of about 1/32 inch of the coating along the scribed area and no blisters on the face of the panel. Both the latex and urethane primed panels failed to pass this test.

Condensing Humidity Test

Aluminum panels were suspended at a 15° angle (from the horizontal) over a bath of tap water maintained at 140° F. for 240 hours. All panels showed no coating failure after 240 hours. This test was repeated for each coating system applied to galvanized steel panels and only the panel having the inventive primer passed the condensing humidity test.

The foregoing results clearly demonstrate the synergistic effect of the binder combination of the present inventive primer. The overall performance of the latex primer and the urethane primer were not considered acceptable for industrial coil coating operations. Also, the results of the individual tests for the comparative primers are not predictive of the results obtained for the inventive primer. The overall performance of the inventive primer was easily within accepted industry standards. The inventive primer also displays such good performance with other topcoat systems and with coils of other types of metals.

We claim:

1. A heat-curable coil coating primer in aqueous dispersion for priming metal coil stock comprising:
    a. a film-forming binder phase of a heat-curable, water-dispersed polyurethane polymer and a water-dispersed, heat-curable resinous latex in synergistic combination; and
    b. a pigment phase of corrosion-inhibiting pigment, said synergistic combination of said polyurethane polymer and said resinous latex improving one or more of the following properties of said primer when said primer is applied to metal coil stock, topcoated, and heat cured: flexibility and impact resistance, adhesion to said coil stock and to a topcoat applied over said primer, humidity and water resistance, and chemical and corrosion resistance.

2. The primer of claim 1 wherein said polyurethane polymer is a polyester-polyurethane polymer.

3. A heat-curable coil coating primer in aqueous dispersion for priming metal coil stock which comprises: a binder phase comprising about 10% to 85% of a heat-curable, water-dispersed polyurethane polymer, and about 15% to 90% of a water-dispersed thermosetting resinous latex and/or a thermoplastic resinous latex, both percentages being by weight of said binder phase; and a pigment phase comprising corrosion-inhibiting pigment, the weight ratio of said pigment phase to said binder phase (P/B) being from about 0.05 to about 1.0.

4. The coil coating primer of claim 3 wherein said polyurethane polymer is a polyester-polyurethane polymer.

5. The coil coating primer of claim 4 wherein said polyester-polyurethane is amine neutralized for dispersing in water.

6. The coil coating primer of claim 4 wherein between about 15% to about 60% of said binder phase is said polyester-polyurethane and between about 85% and 40% of said binder phase is said resinous latex.

7. The coil coating primer of claim 4 wherein between about 25% and about 35% of said binder phase is said polyester-polyurethane and between about 75% and 65% of said binder phase is said resinous latex.

8. The coil coating primer of claim 3 wherein said thermosetting resinous latex and/or said thermoplastic resinous latex comprises an acrylic latex polymer and/or copolymer.

9. The coil coating primer of claim 8 wherein said binder phase includes about 5% to about 25% aminoplast cross-linking agent for said polyester-polyurethane, and said polyester-polyurethane ranges from about 5% to about 60%; and said pigment phase includes from about 25% to about 98% opacifying pigment.

10. A metal coil stock having coated thereon the heat-curable coil coating primer of claim 3.

11. A metal coil stock having a heat-cured coating coated thereon of the coil coating primer of claim 3.

12. A process for coating a heat-curable coil coating primer in aqueous dispersion onto metal coil stock, which comprises:
    applying a film of said primer to said coil stock, said primer comprising (a) a film-forming binder phase of about 10% to about 85% of a heat-curable, water-dispersed polyurethane polymer and about 15% to about 90% of a water-dispersed, thermosetting resinous latex and/or a thermoplastic resinous latex; and (b) a pigment phase comprising corrosion-inhibiting pigment; and
    heat curing said film of said primer.

13. The process of claim 12 wherein a heat-curable topcoat is applied as a film over said heat-cured primer.

14. The process of claim 12 wherein said primer of coil stock is air dried at a temperature insufficient to cure said film of said primer, a heat-curable topcoat is applied as a film over said air-dired film of said primer, and said topcoated, primed coil stock is heated at a temperature and for a time sufficient to cure both said primer and said topcoat.

* * * * *